Oct. 28, 1958     W. H. DIEHL ET AL     2,857,723
APPARATUS FOR FINISHING MERCURY SWITCHES
Filed Nov. 13, 1956     6 Sheets-Sheet 1

INVENTORS
W. H. DIEHL
A. NOLDE
BY
ATTORNEY

Oct. 28, 1958    W. H. DIEHL ET AL    2,857,723
APPARATUS FOR FINISHING MERCURY SWITCHES
Filed Nov. 13, 1956    6 Sheets-Sheet 2
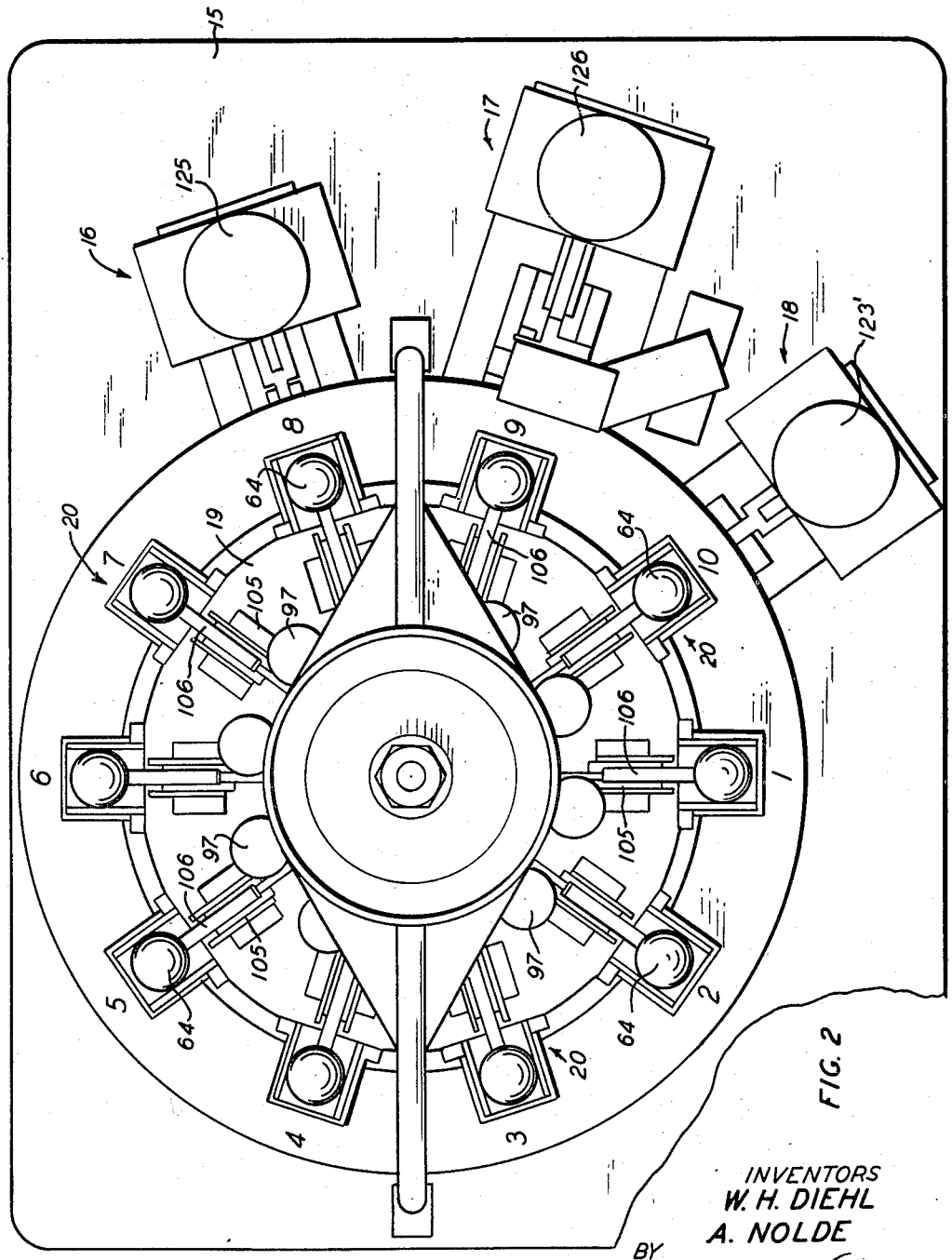
FIG. 2
INVENTORS
W. H. DIEHL
A. NOLDE
BY
ATTORNEY

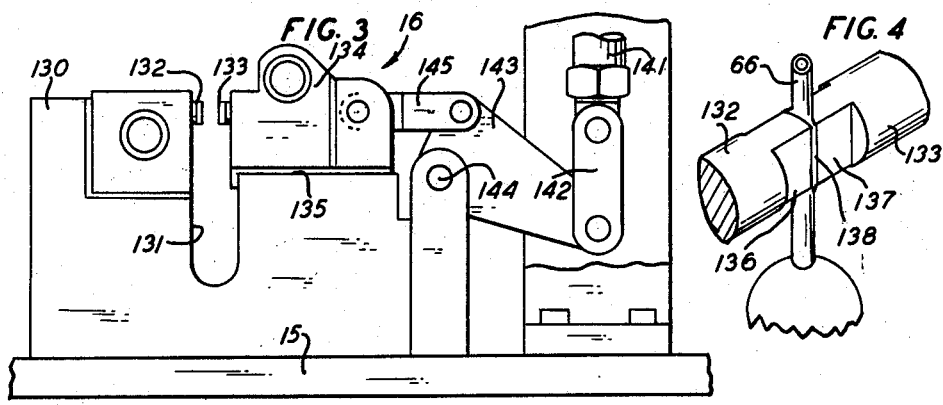
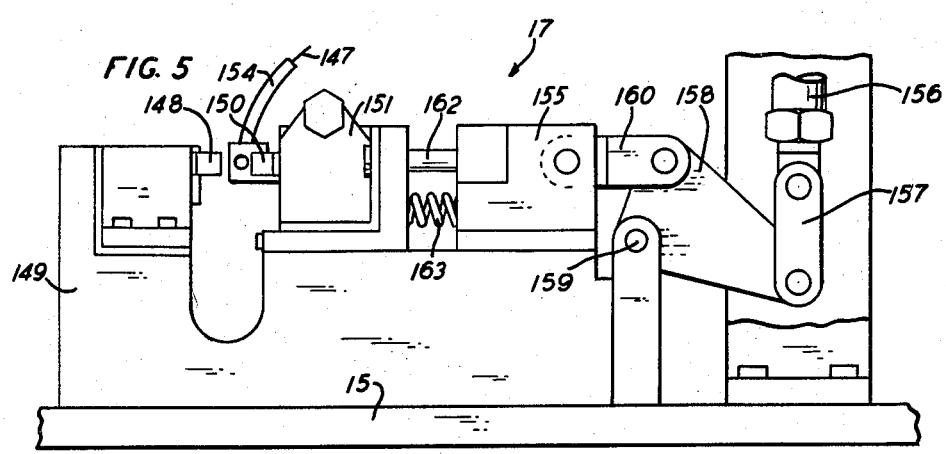
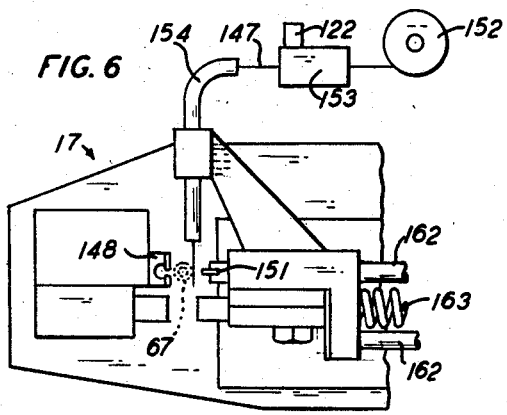

Oct. 28, 1958 W. H. DIEHL ET AL 2,857,723
APPARATUS FOR FINISHING MERCURY SWITCHES
Filed Nov. 13, 1956 6 Sheets-Sheet 4
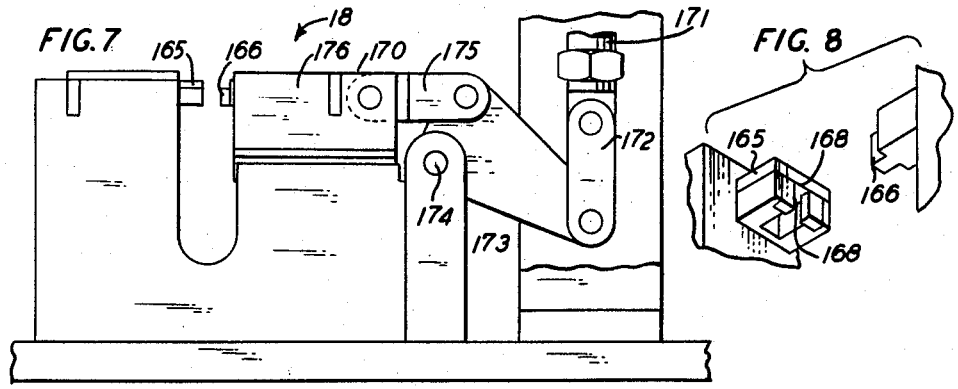
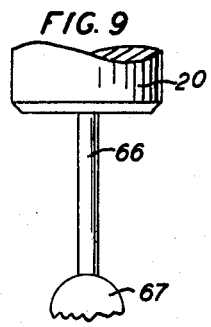
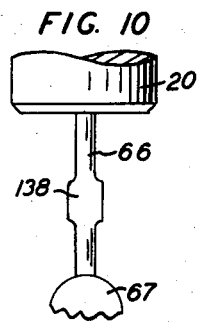
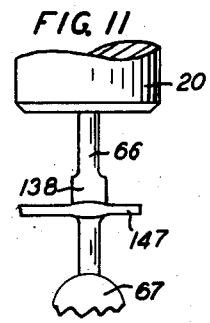
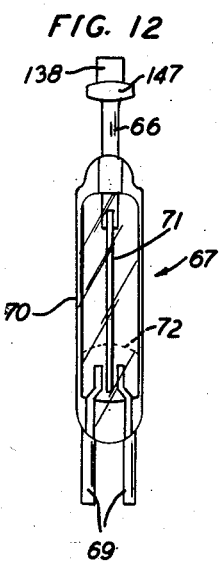
INVENTORS
W. H. DIEHL
A. NOLDE
BY
ATTORNEY

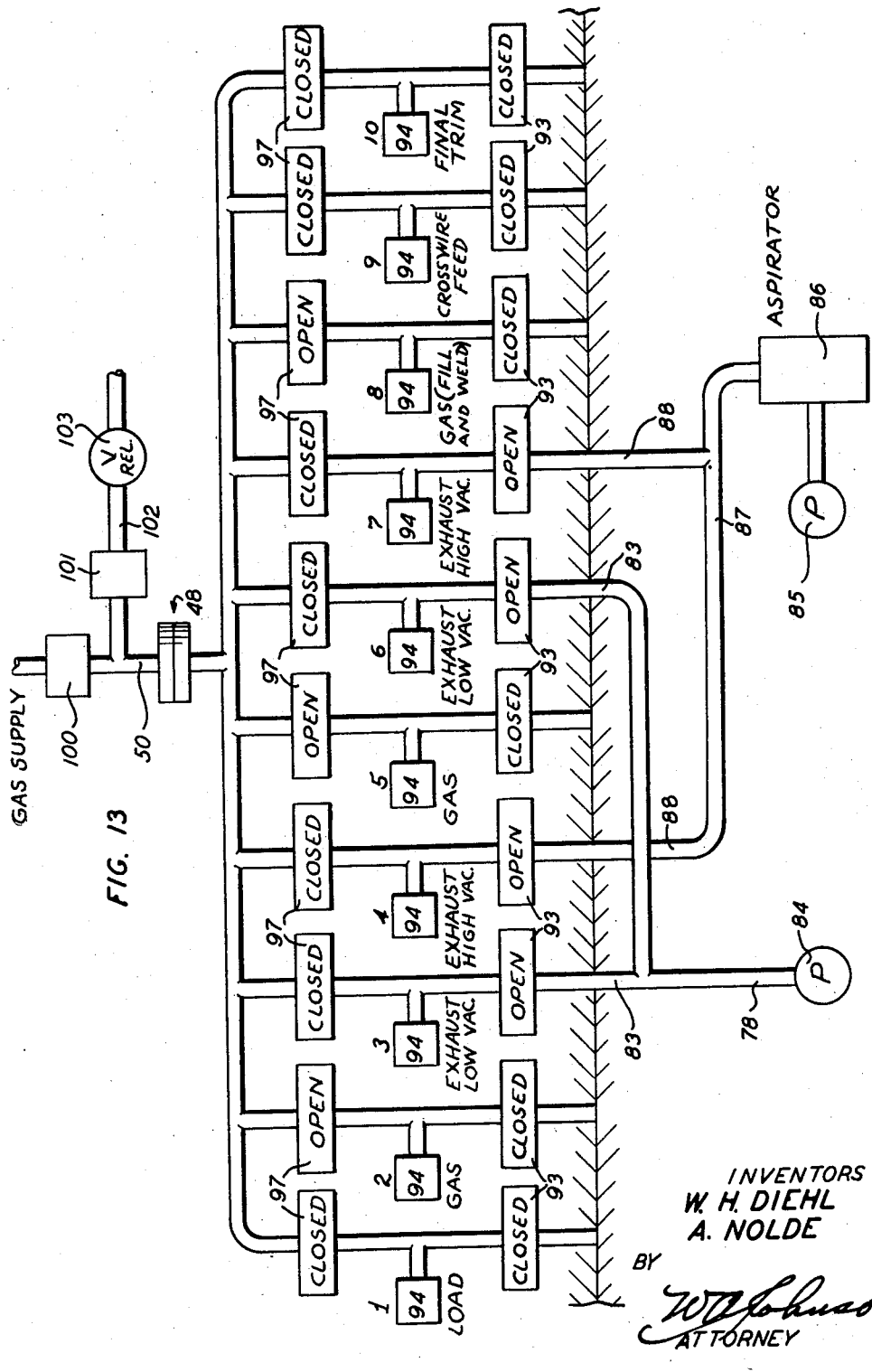

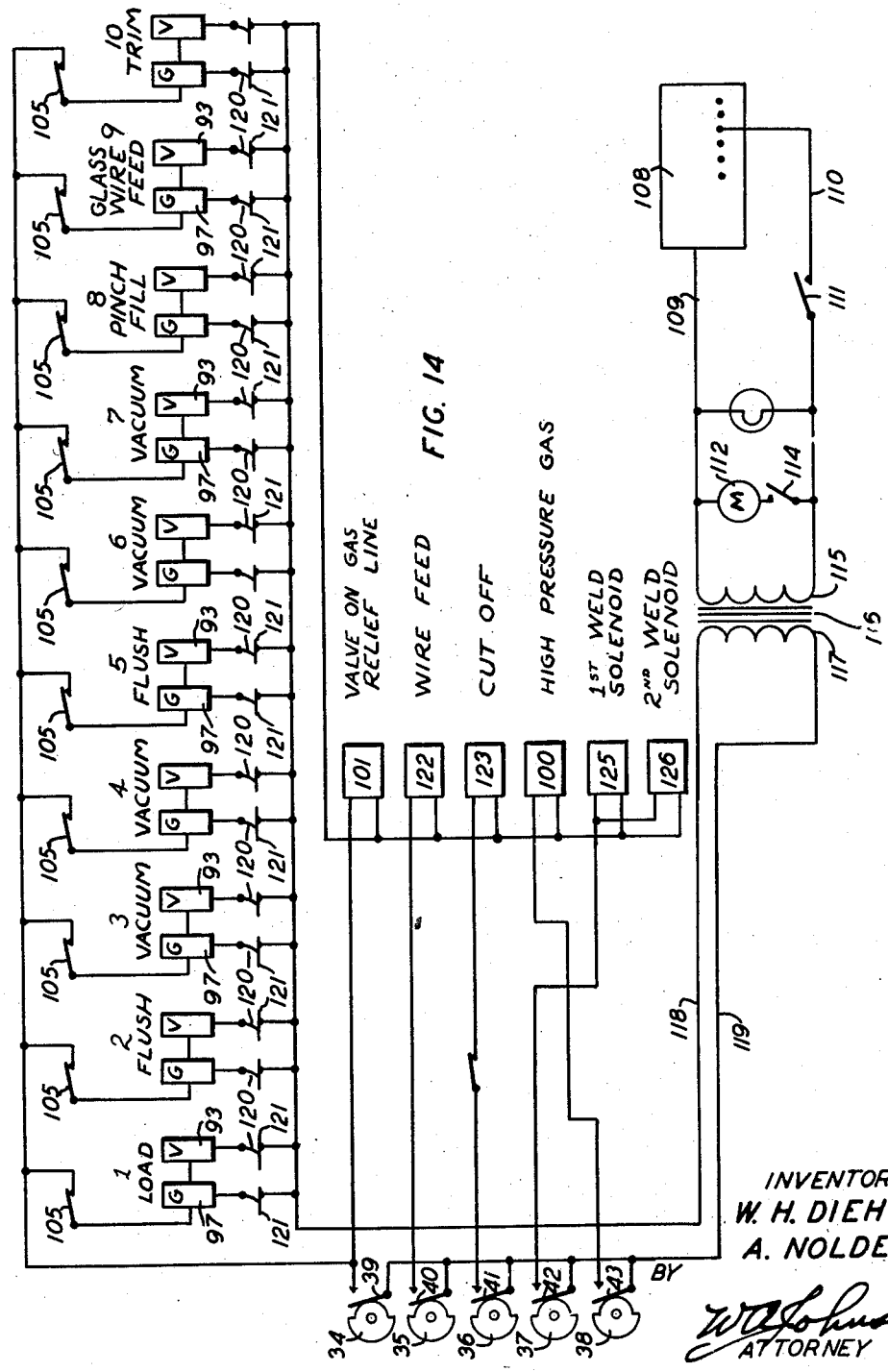

United States Patent Office 2,857,723
Patented Oct. 28, 1958

2,857,723

APPARATUS FOR FINISHING MERCURY SWITCHES

Walter H. Diehl and Arnold Nolde, Allentown, Pa., assignors to Western Electric Company, Incorporated, New York, N. Y., a corporation of New York Application November 13, 1956, Serial No. 621,830

7 Claims. (Cl. 53—79)

This invention relates to apparatus for finishing mercury switches and particularly apparatus for exhausting, filling with gas and sealing mercury switches.

Certain types of mercury switches employed in the communication field are formed with terminals sealed in one end of a glass envelope and a contact strip of metal fixed to one end of a metal tube and housed in the glass envelope by the sealing of the end of the glass envelope about the tube. A quantity of mercury is disposed in the glass envelope and the mercury switch thus far constructed must be completed by exhausting the air from the glass envelope, filling the glass envelope with a suitable gas and sealing the metal tube to retain the gas under a given pressure in the envelope.

The desired pressure of the gas in the envelope of the finished mercury switch is sufficiently high to cause breakage of the envelope if this pressure should be applied rapidly. This, therefore, presented the problem of finishing mercury switches with the desired high pressure gas content in the glass envelope without breakage of the envelope.

An object of the present invention is an apparatus for finishing mercury switches efficiently and accurately with a minimum loss due to breakage resulting from admission of gas at high pressures.

In the present embodiment of the invention, the apparatus for finishing mercury switches enclosed in glass envelopes and having metal tubulations open through like ends thereof, includes chucks mounted at spaced positions about a head with each chuck having a passageway therein and means, including the passageway, actuable at a loading station to releasably grip a tubulation of one of the switches and form an air-tight connection between the passageway and the tubulation. The apparatus also includes means to rotate the head intermittently to advance the chucks successively to stations away from and back to the loading station, a gas supply means for each chuck operable at predetermined stations to force a gas under a given pressure through the passageway, tubulation and into the switch, suction means for the chucks operable at certain other stations to exhaust the switches held thereby and means to close the tubulation.

More specifically the apparatus includes electrical controls for the valves of each chuck and passageway whereby at certain stations, each switch is charged with gas under predetermined pressure then exhausted and again charged with gas at a low pressure and subsequently at a high pressure to prevent breaking of the glass. At the later stations after the glass envelope is filled with gas, first at a low pressure and then at the maximum pressure, the tubulation is closed and welded closed. At another station to assure against possible leakage through the tubulation and to reinforce the closed portion of the tubulation, a wire is moved transversely of the weld portion of the tubulation and welded thereto. At a final station, the wire is trimmed and the tubulation cut and allowed to drop from the apparatus.

Other objects and advantages will be apparent from the following detailed description when considered in conjunction with the accompanying drawings, wherein:

Fig. 2 is a top plan view of the apparatus;

Fig. 3 is a fragmentary side elevational view of the tubulation, sealing and welding unit;

Fig. 4 is a fragmentary isometric view of the forming electrodes of the unit shown in Fig. 3 completing the sealing and welding operations on the tubulation;

Fig. 5 is a fragmentary side elevational view of the wire feeding and welding unit;

Fig. 6 is a fragmentary top plan view of the wire feeding and welding unit;

Fig. 7 is a fragmentary side elevational view of the trimming unit;

Fig. 8 is a fragmentary isometric view of the trimming elements of the units shown in Fig. 7;

Fig. 9 is a fragmentary detailed view of the tubulation of a switch supported by one of the chucks;

Fig. 10 is a fragmentary elevational view of the tubulation of Fig. 9 after the sealing and welding operation;

Fig. 11 is a fragmentary elevational view of the tubulation of Fig. 10 after the wire has been fed thereto and welded to the flattened portion of the tubulation;

Fig. 12 is an elevational view of a finished mercury switch after the wire and tubulation have been cut at the trimming station shown in Fig. 7;

Fig. 13 is a schematic illustration of the exhausting and gas filling means, and Fig. 14 is a schematic wiring diagram illustrating the electrical controls of the apparatus.

Figure 1:
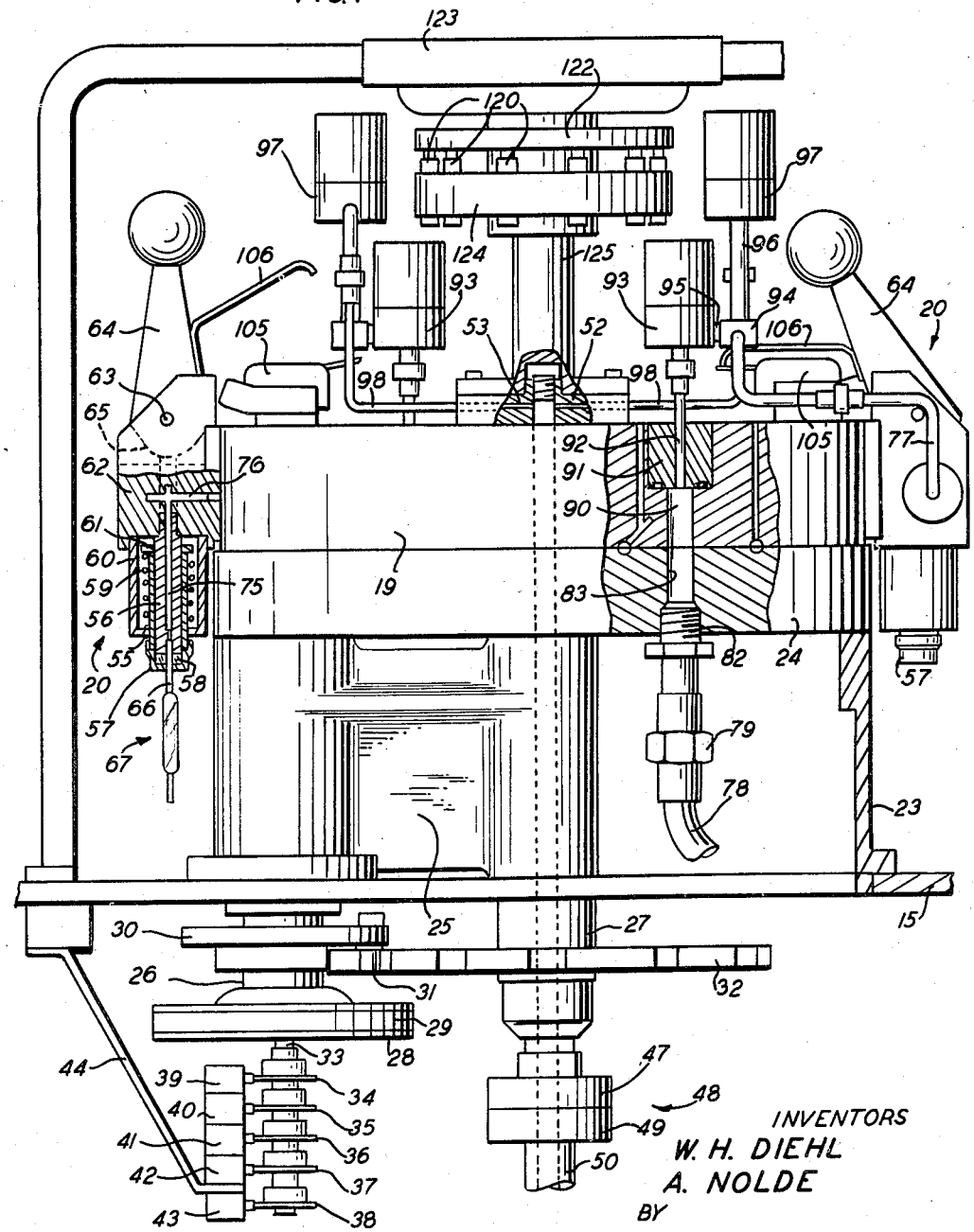
Fig. 1 is a front elevational view of the apparatus, a number of the chuck units having been removed and a portion being shown in section to more clearly illustrate invention.

Referring now to the drawings, attention is directed first to Fig. 2 which illustrates the table 15 for supporting a sealing and welding unit indicated generally at 16, a wire feeding and welding unit indicated generally at 17 and a trimming unit indicated generally at 18 positioned radially about a turret 19 on which ten chuck units 20 are mounted at radially spaced positions. The chuck units move intermittently with the turret 19 relative to stations identified by numbers 1 to 10 inclusive.

Referring now to Fig. 1, the table 15 supports a housing 23 which includes supporting a horizontal member 24 and a structure 25 which houses bearings for the main drive shaft 26 and a hollow turret shaft 27. The drive shaft 26 supports a fixed pulley 28 connected to a power means (not shown) by a belt 29. A conventional Geneva arm 30, with its roller 31, is mounted on the shaft 26 and is rotated continuously at a given speed to interengage a conventional Geneva gear 32 fixedly mounted on the turret shaft 27 to impart like intermittent rotary motions to the turret shaft to move the chuck units 20 to their successive stations. The shaft 26 has a reduced portion 33 supporting cams 34, 35, 36, 37 and 38 which are adapted to actuate their respective switches 39, 40, 41, 42 and 43 supported by a bracket 44, mounted beneath the frame 15. The hollow shaft 27 is connected to a movable portion 47 of a coupling 48, a stationary portion 49 of which is connected to a gas supply line 50. The upper end of the hollow shaft 27 has a head 52 mounted thereon and provided with ten radially extending passageways 53 which communicate at their inner ends with the hollow portion of the shaft 27, connecting them to the gas supply line 50.

The ten chucks 20 mounted at equally spaced positions about the turret 19 are identical in structure and shown more in detail in Fig. 1. Each chuck has a sleeve 55 in which a centrally apertured plunger 56 is disposed, a cap 57 threadedly mounted on the lower threaded end of the sleeve 55 is centrally apertured at its lower end and supports a flexible chuck member 58 formed of suitable material such as rubber. The plunger 56 is normally held upwardly by a spring 59 disposed in a housing 60 resting on the lower portion thereof concentric with the sleeve 55 and engaging a collar 61 fixed to the plunger 56. The plunger 56 extends upwardly through a supporting block 62 which is bifurcated at its upper end to support a spindle 63 of a cam lever 64. A cam surface 65 of the lever 64 engages the upper end of the plunger 56 and holds it in its downward position where it will compress the flexible chuck member 58 to grip a metal tubulation 66 of a partially completed mercury switch 67.

The mercury switch to be completed by this apparatus is shown more in detail in Fig. 12 and includes treminals 69 sealed in the lower end of a glass envelope 70 while the tubulation 66 (as shown in Fig. 9), having a sheet metal contact 71 fixed to the lower end thereof without closing the lower end of the tubulation, is sealed in the upper end of the glass envelope. The switch is also provided with a quantity of mercury 72. The partially completed mercury switches are inserted in the chucks 20 successively while the chucks are in the loading station 1. At this time, the operator moves the cam lever forwardly or counterclockwise (Fig. 1) allowing the chuck to open to drop a portion of a tubulation remaining therein from a previously completed mercury switch, and to receive the tubulation of another switch to be completed. The tubulation 66 of the switch 67 is moved upwardly a given distance determined by a stop of any suitable means in the chuck and forming communication between the central aperture or passageway 75, the tubulation and the interior of the glass envelope 70. The passageway 75 is closed near the top of the plunger 56 but is open to a passageway 76 in the mounting block 62, where a fluid line 77 is connected, when the cam lever 64 is in its operating position.

The gas supply 50 has been described as being connected through the coupling 48 with the hollow shaft 27 and the head 52. A vacuum or suction line 78, illustrated in Fig. 1, is connected through a coupling 79 and a threaded element 80 to the head member 24 of the main housing 23 in communication with a passageway 83. Actually there are two sets of vacuum or suction units (Fig. 13) one identified as a low vacuum unit 84 and the other as a high vacuum unit 85. In reality, the units 84 and 85 are suction pumps operated to create the desired suction or vacuum for exhausting the mercury switches at stations 3—6 and 4—7, respectively. The unit 84 is given the reference numerals 78 and 83 used in Fig. 1 to identify the connections thereof with stations 3 and 6. The unit 84 is connected through an aspirator 86 and lines 87 for connection with similar passageways 88 at stations 4 and 7.

The turret 19 has a passageway 90 disposed along the radial line toward each chuck to register successively with the passageways 83 and 88 as shown in Fig. 13 during their intermittent movement through each cycle of the turret. Each passageway 19 has an enlarged portion housing a sealing member 91 supporting a line 92 leading to a solenoid valve 93. A header 94 communicates with the outlet 95 of the solenoid valve 93 and with an outlet 96 of a solenoid valve 97. The header is connected to line 77 which in turn is connected to the passageway 76 of the adjacent chuck 20. The solenoid valve 97 is connected through its line 98 to the head 52 on the shaft 27. There are solenoid valves 93 and 97 for each chuck and lines connecting each through their header 94 and the chuck 20 to selectively supply gas to the glass envelope of each mercury switch and to evacuate the glass envelope at certain of the stations during each operating cycle.

The schematic illustration of the vacuum units and the gas supply together with the solenoid valves and the communicating lines to each chuck at each station is illustrated in Fig. 13. In addition to that previously described, there is a solenoid valve 100 in the main gas supply and a solenoid valve 101 in a line 102 containing a relief valve 103. The function of the relief valve is to reduce the pressure of the gas in line 50 from, for example, 250 pounds to 50 pounds pressure.

The electrical control means for the apparatus is shown schematically in Fig. 14 where the stations are represented by numbers 1 to 10 inclusive, the rectangular members represent the vacuum and gas valves 93—97 at each station and normally closed switches 105 for these valves, which are disposed adjacent each chuck 20 for action into open position by a finger 106 (Fig. 1), mounted on each cam lever 64, when the chuck is rendered out of use. The main source of supply for the electrical energy is represented by a unit 108 (Fig. 14) and lines 109 and 110, with a main switch 111 disposed in line 110. A motor 112, connected between the lines 109 and 110 through a switch 114, is the power means for driving the pulley 28 (Fig. 1). Lines 109 and 110 extend to a primary winding 115 of a transformer 116, the secondary winding 117 of which supplies electrical energy through lines 118 and 119. Line 119 is connected through switch 39, switches 105 and solenoid valves 93 and 97 of each chuck 20 to their respective brushes 120. The brushes 120 engage contact rings or segments 121 of a stationary unit 122, mounted upon a bracket 123. The brushes 120 are supported by a rotating unit 124 mounted on a spindle 125 fixed to the head 52 and functioning as a continuation of shaft 27. The contact rings or segments are constructed in the conventional manner and insulated from each other in their unit 124 to complete circuits through their brushes 120 to cause their solenoid valves to function according to the disclosure in Fig. 13, that is, to cause their respective valves to operate into open position when moved into predetermined stations and to remain open until moved out of said stations. The contact rings or segments are connected in line 118 to complete the circuits through their gas or vacuum valves. The cams 34 to 38 inclusive are shown as being identical in Fig. 14 but it should be understood that these cams have their high and low portions arranged to operate their normally open switches 39 to 43 respectively into closed positions to bring about operation of their respective units 101, 122, 123, 100, 125, 126.

The unit 16 (Figs. 2, 3 and 4) is operable at station 8 a given time interval after each article or switch has been moved into that station and filled with gas, beginning at 50 pounds pressure and gradually increasing to 250 pounds pressure. The unit 16 includes a support 130 mounted on the table 15 and cut away at 131 to provide a path for the successive mercury switches held by the chucks 20. A fixed welding electrode and forming member 132 is included in a welding circuit (not shown). A movable welding electrode and forming member 133 is supported by a carriage 134 mounted at 135 for sliding movement in alignment with and toward and away from the fixed electrode 132. The members 132 and 133 have their working ends reduced as at 136 and 137 (Fig. 4) to jointly engage, flatten, close and weld a portion 138 of the tubulation 66. The carriage 134 for the movable member 133 is actuated through the operation of a solenoid 140 (Fig. 2) pulling a rod 141 upwardly (Fig. 3) to cause a link 142 to rock a lever 143 about its pivot 144 to cause a link 145, connecting the lever 143 to the carriage 134, to move the carriage with sufficient force to cause the members 132 and 133 first to function as forming members after which the welding circuit is closed in a conventional manner (not shown) to weld the flattened portions 138 of the tubulation 66 to thereby seal the tubulation.

The function of the unit 17 is to feed a wire 147 transversely of the portion 138 of each tubulation 66 when located at station 9, to cut off a given length of the wire and to weld the length of wire to the flattened portion 138. The unit 17 is similar in structure to the unit 16 in that a fixed welding electrode 148, mounted on a support 149, is disposed in alignment with a movable electrode 150, which is supported by a carriage 151. Fig. 6 schematically illustrates the wire 147 advanced longitudinally from a supply 152 by a wire feeding unit 153. The wire feeding unit 153 may be of any conventional structure operated intermittently in timed relation with the intermittent movement of the turret, through actuation of the cam 36 and switch 41 to energize the solenoid 122, to advance a given length of wire 147 through a guide tube 154 to a position adjacent the flattened portion 138 of each tubulation 66 moved into station 9. The cutting means for the wire is not shown but it should be understood that any conventional wire cutting means may be operated in association with the electrodes 148 and 151 to cut a portion of the wire during welding of the wire portion to the flattened portion 138. The operating means for the units 17 includes a solenoid 126 (Figs. 2 and 14) energized by to pull a rod 156 upwardly when energized to cause a link 157 to rock a lever 158 about its pivot 159 and cause a link 160 to move the carriage 151. In the present instance, the carriage 151 may be described as being in two parts, 151 and 151' supported for sliding movement, connected for limited relative movement by rods 162 and normally urged away from each other by a spring 163. The spring 163 causes cushioning of the engagement of the electrodes 148 and 150 respectively with the flattened portion 138 and the wire 147.

The function of the unit 18 (Figs. 2, 7 and 8) is to trim the ends of the welded wire portion 147, illustrated in Fig. 11, and to sever the tubulation 66 above the wire portion 147, as illustrated in Fig. 12, allowing the completed mercury switch to drop into a suitable chute directing it away from the apparatus. The unit 18 is similar in structure and operation to the units 16 and 17 with the exception that no welding operation is performed and the fixed member 165 and a movable member 166 are cutting members. The reduced portion of the cutting member 166 has sides and a top forming cutting edges cooperating with cutting edges 168 of the element 165 to trim the wire portion 147 to a length illustrated in Fig. 12 and cut the tubulation 66 above the wire portion. The cutting member 166 is supported by a carriage 170 which is actuated through the energization of a solenoid 123' (Figs. 2 and 14) to pull a rod 171 upwardly with a link 172 to rock a lever 173 about its pivot 174 to cause a link 175, connecting the lever 173 and a carriage 176 for the member 166, to move the member into and out of cutting position.

Considering now the operation of the apparatus, let it be assumed that the pumps or units 84 and 85 have been in operation a length of time sufficient to establish a predetermined suction or vacuum in their respective lines 78 and 87. With the apparatus in readiness for operation, switch 114 (Fig. 14) may be closed to start the motor 112 to begin the operating cycle. The operator seated adjacent station 1 moves the cam lever of each chuck 20, when moved into that station, forwardly or counterclockwise (Fig. 1) to open the chuck and to allow the operator to insert the tubulation 66 of a mercury switch 67 into the chuck. After this has been accomplished the lever 64 is returned to the vertical position allowing the chuck member 58 to grip the tubulation. During movement of the switch 67 from station 1 to station 2, cam 34 (Fig. 14) closes switch 39 to operate solenoid valve 101 (Figs. 13 and 14) in line 102 of the relief valve 103, to reduce the pressure of gas in line 50 from a high pressure of 250 pounds to a low pressure of 50 pounds. When the mercury switch arrives at station 2 the valve 97 for that chuck is open and the valve 93 is closed allowing gas to enter the glass envelope of the switch 67 from supply line 50 (Fig. 1) through the connection 48, shaft 27, head 52, line 98, valve 97, header 94, line 77, passageways 76 and 75, through the tubulation 66 and into the glass envelope of the switch. The function of the switch 39 through the actuation of the cam 34 is such that, after the glass envelope is filled with gas at 50 pounds pressure, the valve 101 will be de-energized allowing the pressure of gas in the glass envelope to build up gradually to the maximum pressure of 250 pounds.

While the apparatus indexes to move the switch to station 3, the valve 97 is closed, cutting off the gas supply and the valve 93 for that chuck is open to the low suction unit 94, giving the mercury switch what is known as a rough pump to remove the major portion of the gas content of the switch so that at station 4 when the switch is open to the high suction unit 85 the switch may be readily evacuated. At station 5 the valve 93 is closed and valve 97 is opened to repeat the function performed at station 2. The mercury switch 67 when entering station 2 is filled with air. The subsequent gas filling and exhausting steps are necessary to reduce and eventually completely remove all the air and leave the switch filled with gas. At station 5, the unit 101 is operated to reduce the pressure in the gas line from 250 pounds per square inch to 50 pounds per square inch and after a given length of time, the unit 100 under the control of switch 42 and cam 37 (Fig. 14) will be de-energized to cut off the gas supply. Following the gas supply at station 5, similar operations are performed at stations 6 and 7 that followed the gas supply at station 2 as illustrated for stations 3 and 4. At station 6, valve 97 is closed and valve 93 is open to the low suction line 78, exhausting the major portion of the gas so that at station 7, connecting the switch with the high suction line 87, complete evacuation may be accomplished. At station 8, the switch is filled with gas, beginning at the low pressure of 50 pounds and building up to the maximum pressure of 250 pounds per square inch. After the switch is filled with gas, the solenoid 125 (Figs. 2 and 14), for unit 16 is energized, by the closing of the cam switch 42 to bring about operation of the unit 16 to compress the tubulation as illustrated at 138 and to weld the compressed portion closed. At station 9, both valves 93 and 97 are closed and at this station, unit 17 is operated to feed the wire 147 transversely of the portion 138 of the tubulation 66 and to weld the wire thereto and cut off a given length of the wire from the supply. At station 10, unit 18 is operated through the actuation of switch 41 to trim the ends of the wire 147 and to cut the tubulation 66 above the wire 147, allowing the completed mercury switch to drop into a chute (not shown). This completes the cycle following one chuck 20 from station 1 through station 10. As this chuck arrives at station 1, the opening of the chuck through the actuation of the lever 64 will allow the remaining portion of the tubulation of the previously completed mercury switch to drop therefrom so that another mercury switch to be completed may be inserted in the chuck.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for finishing mercury switches enclosed in glass envelopes and having metal tubulations open through like ends thereof, the apparatus comprising a rotatable head, chucks mounted at spaced positions about the head, each chuck having a passageway therein and means including the passageway actuable at a loading station to releasably grip a tubulation of a switch and form an airtight connection between the passageway and the tubulation, means to rotate the head intermittently to advance the chucks successively to stations away from and back to the loading station, a gas supply means for each chuck operable at predetermined stations to force a gas under a given pressure through the passageway and tubulation into the switch, suction means for the chucks operable at certain other stations to exhaust the switches held thereby, means operable at one of the stations to compress like portions of the tubulations closed, means to feed wire portions across the compressed portions, and means to weld the compressed portions and the wire.

2. An apparatus for finishing mercury switches enclosed in glass envelopes and having metal tubulations open through like ends thereof, the apparatus comprising a rotatable head, chucks mounted at spaced positions about the head, each chuck having a passageway therein and means including the passageway actuable at a loading station to releasably grip a tubulation of a switch and form an airtight connection between the passageway and the tubulation, means to rotate the head intermittently to advance the chucks successively to stations away from and back to the loading station, a gas supply means for each chuck operable at predetermined stations to force a gas under a given pressure through the passageway and tubulation into the switch, suction means for the chucks operable at certain other stations to exhaust the switches held thereby, means operable at one of the stations to compress like portions of the tubulations closed, means to feed wire portions across the compressed portions, means to weld the compressed portions and the wire, and means actuable to trim the welded wire portions to predetermined lengths.

3. An apparatus for finishing mercury switches enclosed in glass envelopes and having metal tubulations open through like ends thereof, the apparatus comprising a rotatable head, chucks mounted at spaced positions about the head, each chuck having a passageway therein and means including the passageway actuable at a loading station to releasably grip a tubulation of a switch and form an airtight connection between the passageway and the tubulation, means to rotate the head intermittently to advance the chucks successively to stations away from and back to the loading station, a gas supply means for each chuck operable at predetermined stations to force a gas under a given pressure through the passageway and tubulation into the switch, suction means for the chucks operable at certain other stations to exhaust the switches held thereby, relatively movable electrodes disposed at one of the stations and actuable to compress closed and weld like intermediate portions of the tubulations of the switches successively, means disposed at another of the stations to feed a wire across the compressed portions successively, and a unit actuable to weld the wire to the successive compressed portions and cut a given length therefrom.

4. An apparatus for finishing mercury switches enclosed in glass envelopes and having metal tubulations open through like ends thereof, the apparatus comprising a rotatable head, chucks mounted at spaced positions about the head, each chuck having a passageway therein and means including the passageway actuable at a loading station to releasably grip a tubulation of a switch and form an airtight connection between the passageway and the tubulation, means to rotate the head intermittently to advance the chucks successively to stations away from and back to the loading station, a gas supply means for each chuck operable at predetermined stations to force a gas under a given pressure through the passageway and tubulation into the switch, suction means for the chucks operable at certain other stations to exhaust the switches held thereby, relatively movable electrodes disposed at one of the stations and actuable to compress closed and weld like intermediate portions of the tubulations of the switches successively, means disposed at another of the stations to feed a wire across the compressed portions successively, a unit actuable to weld the wire to the successive compressed portions and cut a given length therefrom, and means to trim excess lengths from the welded wire portions.

5. An apparatus for finishing mercury switches enclosed in glass envelopes and having metal tubulations open through like ends thereof, the apparatus comprising a rotatable head, chucks mounted at spaced positions about the head, each chuck having a passageway therein and means including the passageway actuable at a loading station to releasably grip a tubulation of a switch and form an airtight connection between the passageway and the tubulation, means to rotate the head intermittently to advance the chucks successively to stations away from and back to the loading station, a gas supply means for each chuck operable at predetermined stations to force a gas under a given pressure through the passageway and tubulation into the switch, suction means for the chucks operable at certain other stations to exhaust the switches held thereby, relatively movable electrodes disposed at one of the stations and actuable to compress closed and weld like intermediate portions of the tubulations of the switches successively, means disposed at another of the stations to feed a wire across the compressed portions successively, a unit actuable to weld the wire to the successive compressed portions and cut a given length therefrom, means to trim excess lengths from the welded wire portions, and means to sever the tubulations short of the sealed portions.

6. An apparatus for finishing mercury switches enclosed in glass envelopes and having metal tubulations open through like ends thereof, the apparatus comprising a rotatable head, chucks mounted at spaced positions about the head, each chuck having a passageway therein and means including the passageway actuable at a loading station to releasably grip a tubulation of a switch and form an airtight connection between the passageway and the tubulation, means to rotate the head intermittently to advance the chucks successively to stations away from and back to the loading station, a gas line connected to each chuck passageway and having a normally closed gas valve operable into open position, means to connect a gas supply to the gas lines, a suction line connected to each chuck passageway and having a normally closed suction valve operable into open position, low and high suction means adapted for connection with the suction lines at different stations to successively apply a low suction to a switch at one station and a high suction to the switch at the next station, and means to operate the valves at predetermined stations to selectively gas fill and evacuate the switches, and means to close the tubulations.

7. An apparatus for finishing mercury switches enclosed in glass envelopes and having metal tubulations open through like ends thereof, the apparatus comprising a rotatable head, chucks mounted at spaced positions about the head, each chuck having a passageway therein and means including the passageway actuable at a loading station to releasably grip a tubulation of a switch and form an airtight connection between the passageway and the tubulation, means to rotate the head intermittently to advance the chucks successively to stations away from and back to the loading station, a suction means for the chucks operable at certain stations to exhaust the switches held thereby, a gas supply means operable at certain other stations to force a quantity of gas under a maximum known pressure into each switch, means actuable to cause initial portions of the quantities of gas to flow into the switches at a lower minimum pressure, and means to close the tubulations.

References Cited in the file of this patent

UNITED STATES PATENTS

| | | |
|---|---|---|
| 2,132,538 | McGowan | Oct. 11, 1938 |
| 2,215,100 | Gustin | Sept. 17, 1940 |
| 2,265,381 | Malloy | Dec. 9, 1941 |
| 2,403,073 | Geiger et al. | July 2, 1946 |